United States Patent [19]

Schmitz

[11] Patent Number: 4,697,124
[45] Date of Patent: Sep. 29, 1987

[54] INTEGRAL SERIES PARALLEL AND POWER BRAKE CONTROLLER FOR A TRANSIT VEHICLE

[75] Inventor: William E. Schmitz, Wilkinsburg Boro, Pa.

[73] Assignee: Westinghouse Electric Corp., Pittsburgh, Pa.

[21] Appl. No.: 887,293

[22] Filed: Jul. 18, 1986

[51] Int. Cl.⁴ .............................................. H02P 7/67
[52] U.S. Cl. ...................................... 318/63; 318/83; 318/111
[58] Field of Search ...................... 318/53, 62, 63, 83, 318/93, 95, 101, 102, 111, 112, 113, 139

[56] References Cited

U.S. PATENT DOCUMENTS

| | | | |
|---|---|---|---|
| 665,350 | 1/1901 | Shipman | 318/93 |
| 708,962 | 9/1902 | Henry | 318/93 |
| 749,271 | 1/1904 | Dodd | 318/93 |
| 3,184,664 | 5/1965 | Cunningham et al. | 318/111 X |
| 3,305,712 | 2/1967 | Hoffman | 318/63 |

Primary Examiner—Bernard Roskoski
Assistant Examiner—Bentsu Ro
Attorney, Agent, or Firm—E. F. Possessky

[57] ABSTRACT

An integral series parallel changeover and power dynamic brake controller apparatus for a transit vehicle disclosed. The controller utilizes a single cam shaft to operate switches for the series parallel function and the power brake function. The apparatus includes a cam shaft return spring which is latched out during normal operation. Upon a power failure the spring is released. An escapement mechanism is provided to slow the rotation of the cam shaft upon the spring being released to provide for desirable sequential operation of the power circuit.

13 Claims, 24 Drawing Figures

FIG. 24

INTEGRAL SERIES PARALLEL AND POWER BRAKE CONTROLLER FOR A TRANSIT VEHICLE

BACKGROUND OF THE INVENTION

This invention relates generally to control apparatus for transit vehicles and, in particular, to series parallel control and power brake control apparatus. Series parallel control and power brake control for operating the traction motors of a typical transit vehicle are known int he art such as disclosed in the *Westinghouse Engineer,* March, 1973, Volume 33, Number 2 in an article entitled "Alternative Systems for Rapid-Transit Proplusion and Electrical Braking" by B. J. Krings, which article is incorporated herein by reference. The article discusses the use of a series parallel controller and a power-brake controller in a motor circuit. As discussed in the article with regard to cam-controlled equipment, in the motoring mode the four motors of the transit vehicle are initially connected in series with the acceleration resistors (Figure 1a of the article). To accelerate, the propulsion cam controller progressively reduces the amount of resistance in series with the motors. When all of the accelerating resistors are shorted out, cam switches in a two-position controller called the series-parallel controller (SPC) make a transistion in motor connections: they reconnect the motors with two in series and the two groups of two motors in parallel. For dynamic braking, the motors are first disconnected from the DC power source, then the cam switches of the two-position controller called the power-brake changeover (PBC) reconnect the motors as parallel generators across the braking resistor as discussed previously (FIG. 2 of the article).

U.S. Pat. No. 3,218,537 issued to John J. Stamm dated Nov. 16, 1965 and assigned to the present assignee also discloses motor acceleration and braking control for a transit system.

In U.S. Pat No. 4,458,185 dated July 3, 1984 issued to Thomas C. Matty et al. and assigned to the present assignee, which is incorporated herein by reference, is disclosed a cam controller apparatus for an electric motor including a cam controller coupled with a current control means that is movable through successive angular positions for sequentially removing one or more selected resistors from the electric motor citcuit. The control apparatus also includes stepping motor means coupled with a cam controller for providing a predetermined angular position movement of the cam controller.

Although the prior art has taught the use of single cam shafts for the accelerating resistors and braking resistors in the cam-controlled motor circuit for a transit vehicle as disclosed in the Matty patent, the prior art teaches separate control apparatus for the series to parallel changeover controller and power-brake controllers. This may lead to difficulty with synchronization of the two controllers.

SUMMARY OF THE INVENTION

The present invention overcomes the difficulties of the prior art by providing an integral series parallel changeover and power dynamic brake controller apparatus for a transit vehicle having cam-controlled motors such as described in the aforesaid Stamm and Matty references. The transit vehicle typically includes a plurality of wheels, electrical traction motors for driving the wheels. The electrical traction motors each have an armature and a field winding. A power source is included for providing power to the traction motors.

The controller apparatus of the present invention comprises a frame for supporting a single cam shaft which is carried thereon. The use of a single cam shaft provides a positive interlock between the series parallel changeover function and the power dynamic brake function. Switching means is provided for switching the electrical motors from a parallel circuit arrangement to a series circuit arrangement as desired and for switching electrically the field and the armature of the motors as desired to effect dynamic braking. A plurality of cams is included. The cams are mounted on the single cam shaft to engage the switching means at predetermined intervals.

Control motor means is provided for rotating the cam shaft in a controlled manner. A cam shaft stop means is desirably included for maintaining the rotation of the cam shaft between a predetermined starting point and final point. A cam shaft return spring is provided for rotating the camshaft back to the starting point in case of loss of power to the controller apparatus. A cam shaft return spring latch is provided for preventing the spring from opposing the control motor during normal operation.

Preferably the control motor means comprises a control motor having an output shaft. A gear means is provided in working relationship with the output shaft of the control motor and the cam shaft, whereby rotation of the output shaft of the control motor causes the cam shaft to rotate. Preferably, the control motor comprises a stepping motor.

The cam shaft stop means preferably includes a first pin for the starting point and a second pin for the final point. Also, desirably, the cam shaft stop further comprises a bar member affixed to the cam shaft for engaging the first and second pin means thereby maintaining the rotation of the cam shaft between the starting point and the final point.

The cam shaft return spring preferably comprises a clock spring having one end affixed to the frame and the other end supported by the cam shaft. Preferably the apparatus further comprises escapement means for slowing the rotation of the cam shaft upon release of the return spring by the return spring latch.

The escapement means desirably comprises a toothed wheel supported by the cam shaft. The toothed wheel means on one side thereof has a hub member extending therefrom coaxially with the cam shaft. The return spring is affixed at one end to the hub member. The other end of the return spring is affixed to the frame as previously discussed. The toothed wheel on the other side thereof has a stopping block affixed thereto in predetermined position. The cam shaft return spring latch preferably comprises a dog member affixed to the cam shaft adjacent to the toothed wheel for contacting the stopping block member. A reciprocating means is positioned in working relationship with the toothed wheel.

The shaft return spring latch preferably further comprises latch assembly means for engaging the block member thereby preventing the spring from opposing the control motor during normal operation.

The cam shaft return spring latch means desirably includes a hinged arm member. The arm member has a hook portion at one end thereof. A support member is provided for supporting the arm member proximate the center thereof. A solenoid activated rod member contacts the other end of the arm member, whereby upon the control motor rotating the cam shaft to a predetermined point, the solenoid is activaed, thereby causing the hook member to engage the block member, thereby preventing the spring from cntacting the dog member affixed to the cam shaft to prevent the spring from opposing the rotation of the control motor. Upon loss of power to the solenoid the shaft return spring latch release the block member thereby positioning the spring to rotate the cam shaft back to the startng point. The reciprocatng means together with the toothed wheel control the rate of return of the cam shaft to the starting point.

BRIEF DESCRIPTION OF THE DRAWINGS

For a better understanding of the invention, reference may be had to the accompanying drawings in which.

DESCRIPTION OF THE PREFERRED EMBODIMENTS

Figure 1:
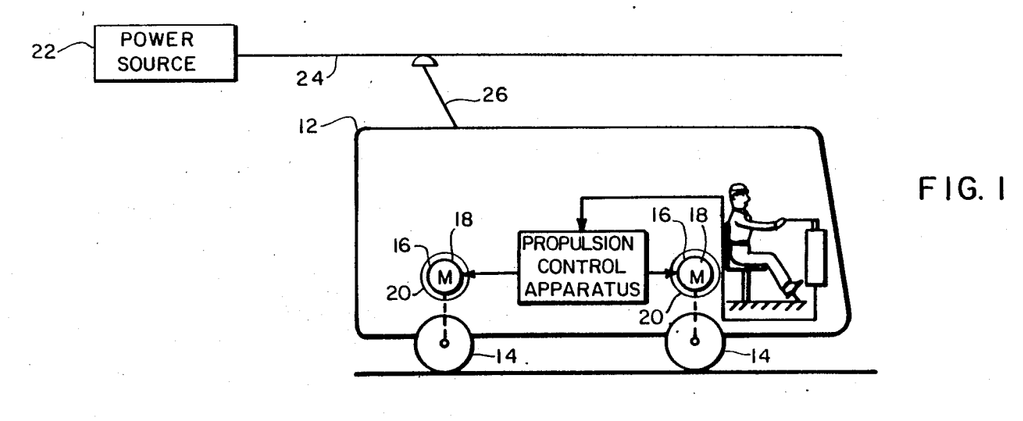
FIG. 1 is a schematic representation of a typical transit vehicle.

Referring to FIG. 1 there is shown an integral series parallel changeover and regenerative brake controller apparatus 10 for a transit vehicle 12 having camcontrolled traction motors such as shown in FIG. 1. Vehicle 12 includes a plurality of wheels 14. Electrical traction motors 16 are included for driving the wheels 14. The electrical motors 16 each have armature means 18 and field means 20 which are schematically represented in FIG. 1. Power source means 22 provides power to the electrical motors through overhead line 24, pickup 26 to proplusion control apparatus 28 which may be such as disclosed in previously cited Westinghouse Engineering article by B. J. Krings or the aforesaid U.S. Pat. No. 4,458,185 issued to Matty et al. or as disclosed in U.S. Pat. No. 3,218,537 issued to Stamm, for example.

Figure 2:
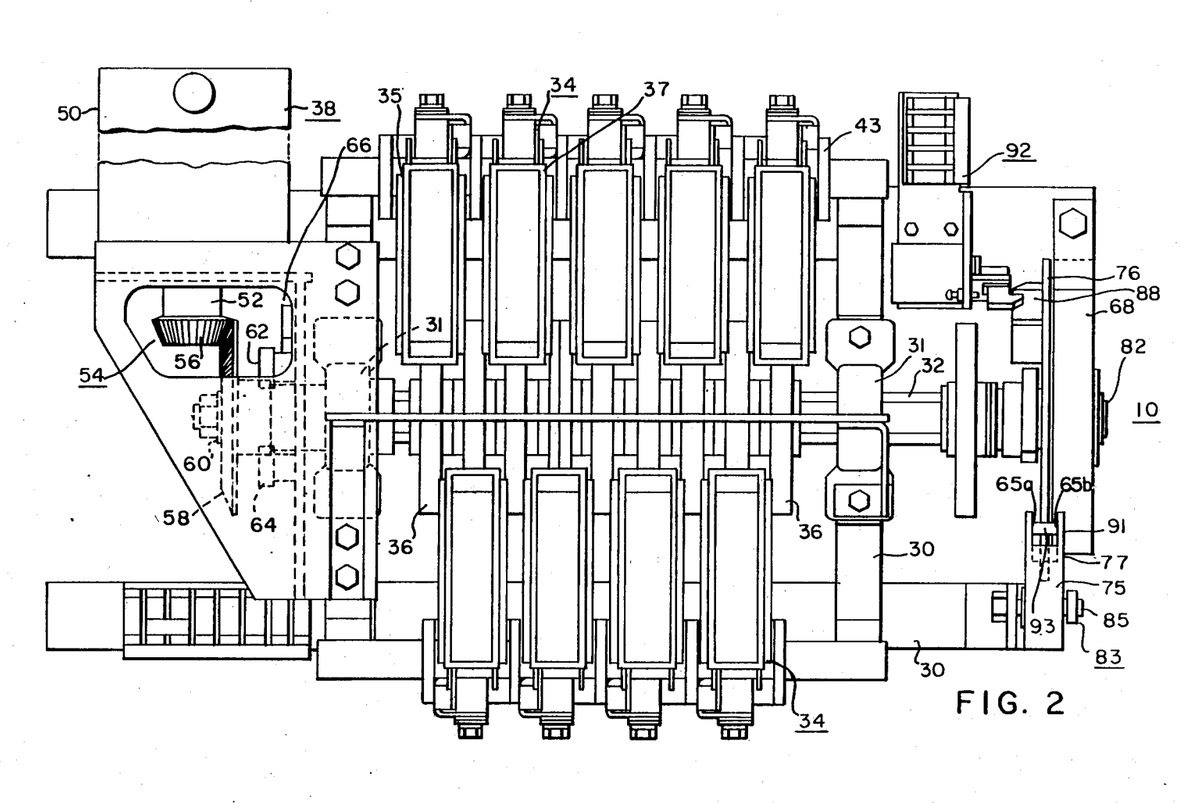
FIG. 2 is a plan view of the integral controller apparatus of the present invention.
Figure 3:
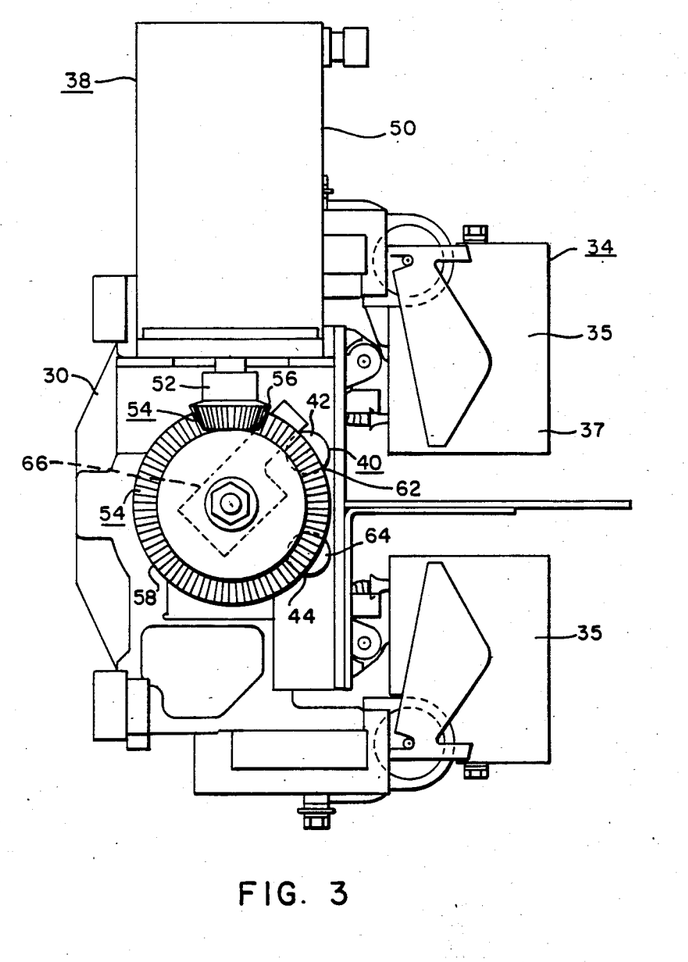
FIG. 3 is an elevational view looking in at the left end of the apparatus shown in FIG. 2.

A controller apparatus 10 of the present invention comprises frame means 30 as shown in FIGS. 2 and 3, a single cam shaft 32 carried by the frame 30. The cam shaft 32 is supported on bearings 31. Switching means 34 is included for switching the electrical motors 16 from a parallel circuit arrangement to a series circuit arrangement as desired and for switching electrically the field means 20 and the armature means 18 of the motors 16 as desired to effect dynamic braking. The switching from series to parallel circuit arrangement and back again and the switching required for dynamic braking where the motors are used as generators to provide the braking is known in the art as discussed, for example, in the aforesaid B. J. Krings article, aforesaid Matty U.S. Pat. No. 4,458,185, and as also discussed in the aforesaid Stamm U.S. Pat. No. 3,218,537. Generally, during acceleration the traction motors 16 are connected in series circuit arrangement to provide higher energy efficiency for the transit vehicle 12. The motors 16 are then reconnected in parallel circuit arrangement once the vehicle is brought up to speed. For dynamic braking, the motors 16 are used as parallel generators and the motor armatures 18 and fields 20 are crossconnected usually in pairs to force load sharing between the motors (connected as parallel generators).

Figure 4:
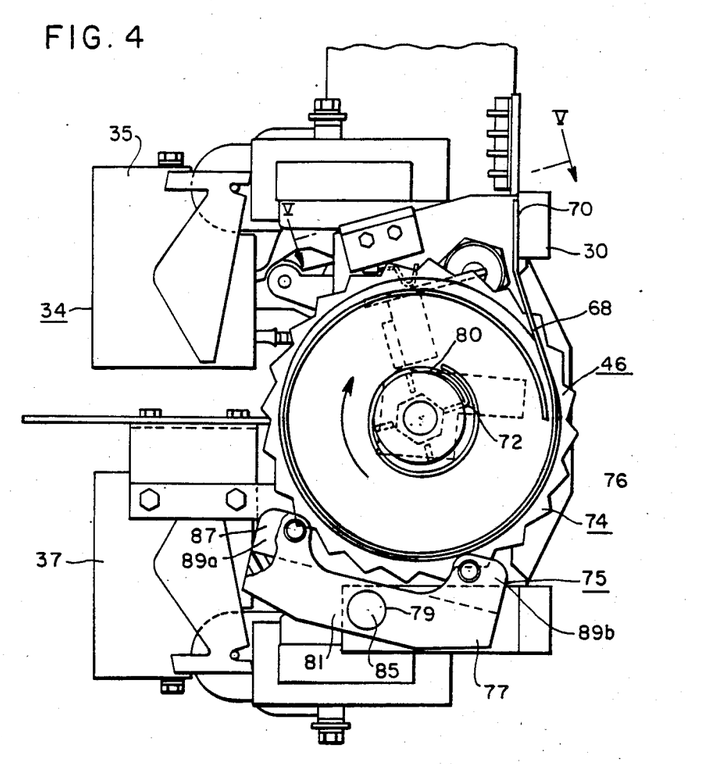
FIG. 4 is an elevational view of the right end of the controller apparatus shown in FIG. 2.
Figure 14:
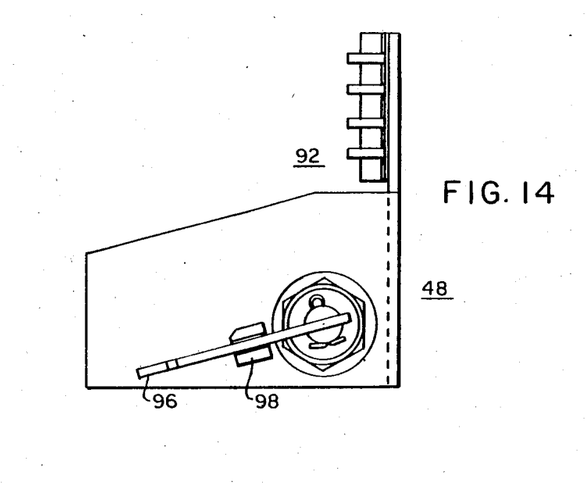
FIG. 14 is the right side elevational view of the shaft return spring latch shown in FIG. 12.
Figure 15:
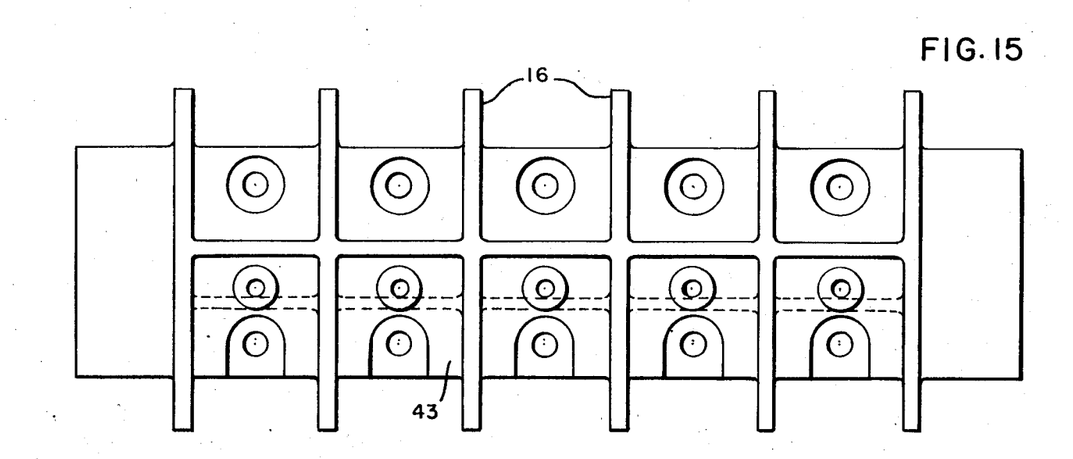
FIG. 15 is a plan view of the switching means contact board.
Figure 16:
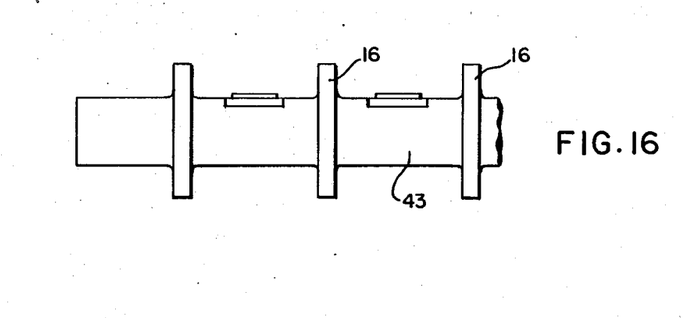
FIG. 16 is a partial elevational view of the contact board shown in FIG. 16.
Figure 17:
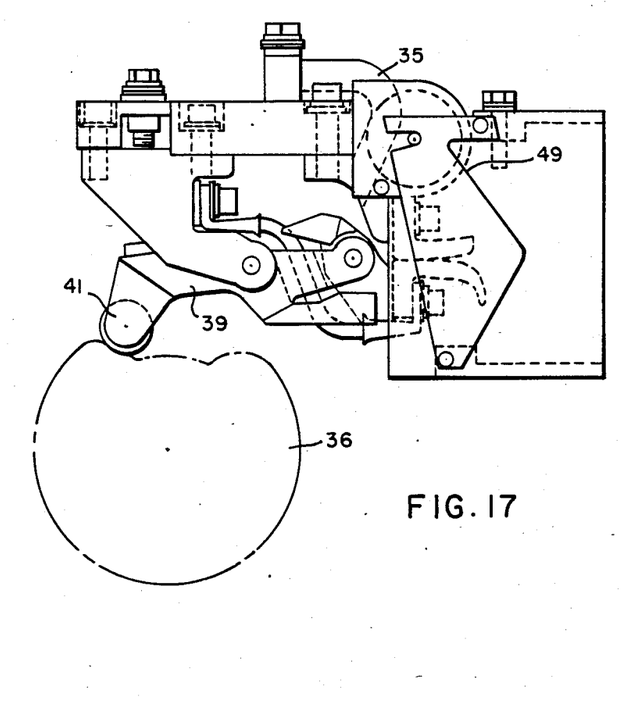
FIG. 17 is an elevational view showing the detailed structure of the typical switch in the upper half of the apparatus shown in FIG. 2.
Figure 18:
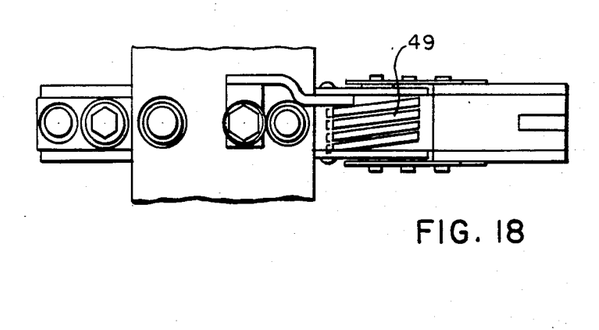
FIG. 18 is a plan view of the switch shown in FIG. 17.
Figure 20:
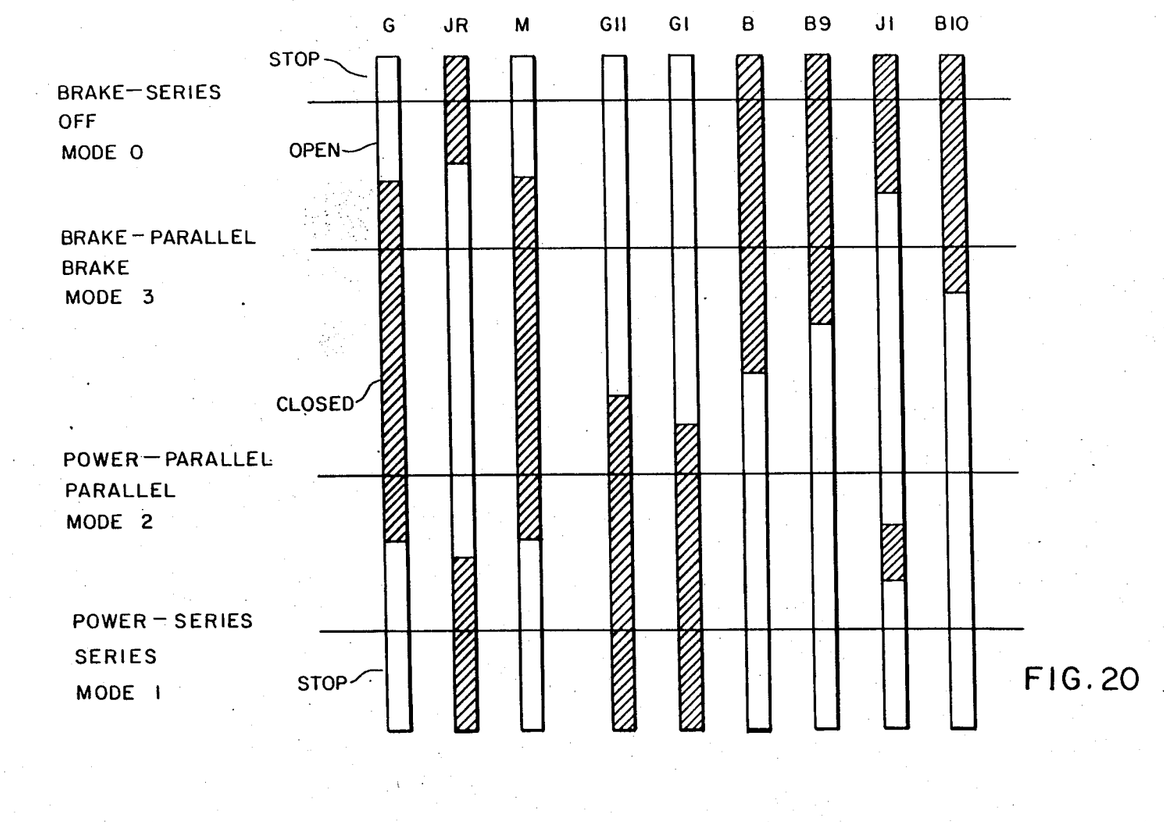
FIG. 20 is a chart showing the cam development of the controller apparatus of the present invention.

The controller apparatus 10 further includes a plurality of cams 36 such as shown in FIG. 2 and 20. The cams 36 are mounted on the cam shaft 32 to engage the switching means 34 at predetermined intervals as desired. The switching means 34 includes a plurality of cam activated switches 35. The detail of switch 35 is shown in FIGS. 17 and 18. The switches 35 are generally conventional. The switches 35 include arc box 37. Moving contact assembly 39 including cam follower 41 is provided. Contact board 43 is provided as shown in FIGS. 15 and 16 for providing terminals for connection. Moving contact 45 and stationary contact 47 are housed within the arc box 37. Magnetic blow-out coil 49 is included for magnetically extinguishing the arc. Control motor means 38 (FIG. 2) is provided for rotating the cam shaft in a controlled manner. The control motor means 38 includes control motor 50 which may be a stepper motor such as Model No. 2007 manufactured by Bodine Company, Chicago, Ill. The use of a stepper motor for rotating a cam shaft is described in the aforesaid U.S. Pat. No. 4,458,185 issued to Matty. Of course, other types of motors may be used for rotating the cam shaft as is known in the art. Cam shaft stop means 40 (FIG. 3) is provided for maintaining the rotation of the cam shaft between the predetermined starting point 42 and final point 44. The cam shaft return spring means 46 is provided for rotating the cam shaft back to the starting point 42 in case of loss of power to the control motor 38 as shown in FIG. 4. The cam shaft return spring latch means 48 such as shown in FIGS. 5, 12–15 is provided for preventing the cam shaft return spring 46 from opposing the control motor means 38 during normal operation.

Preferably the control motor means 38 comprises the control motor 50 having an output shaft 52 (FIG. 2). Gear means 54 is provided in working relationship with the output shaft of the control motor and the cam shaft 32. The gear means 54 preferably comprises first gear 56 and second gear 58. First gear 56 as shown in FIG. 3 is affixed to the output shaft 52 of the control motor 50 and second gear 58 is affixed to one end 60 of the cam shaft 32. The gear means 54 is in working relationship with the output shaft 52 as shown in FIGS. 2 and 3 and the cam shaft 32, whereby rotation of the output shaft of the control motor causes the cam shaft to rotate.

Preferably, the cam shaft stop means 40 includes first pin means 62 for the starting point 42 and second pin means 64 for the final point 44. The cam shaft stop further comprises a bar member 66 as shown in FIGS. 2 and 3 affixed to the cam shaft 32 for engaging the first pin means 62 and the second pin means 64 thereby maintaining the rotation of the cam shaft between the starting point 42 and the final point 44. The cam shaft stop means 40 provides a positive stop for the control motor at the starting and final points 42, 44.

Figure 5:
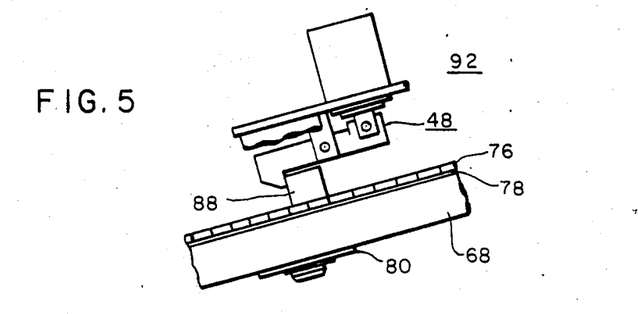
FIG. 5 is a partial plan view of the cam shaft return spring latch contacting the the cam shaft stop.
Figure 6:
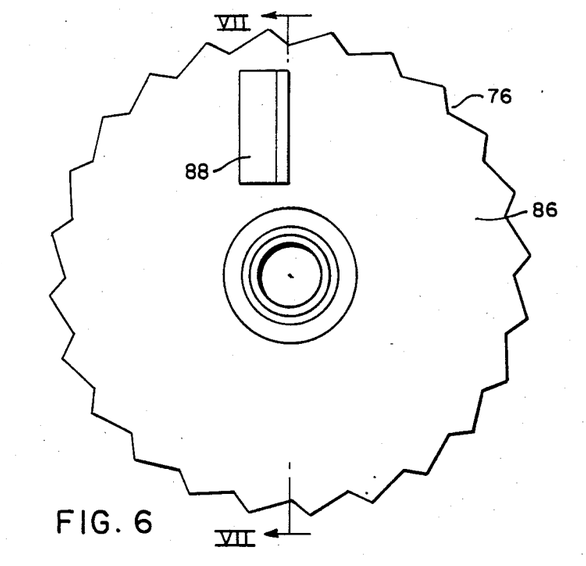
FIG. 6 is an elevational view of the toothed wheel means of the escapement means shown in FIG. 4.
Figure 7:
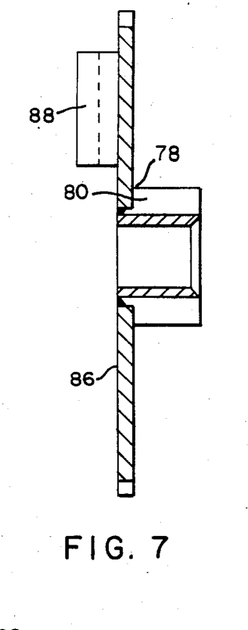
FIG. 7 is a cross-sectional elevational view taken along the line VII—VII of FIG. 6 showing the hub member in position with the toothed wheel.
Figure 8:
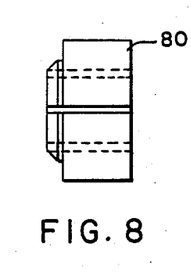
FIG. 8 is a side-elevational view of the hub member shown in FIG. 7.
Figure 9:
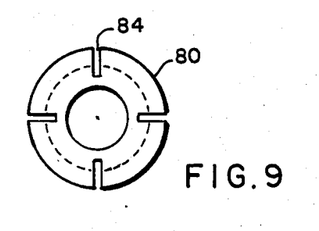
FIG. 9 is an elevational view of the hub member looking in along the right side of FIG. 7.

The cam shaft return spring means 46 preferably comprises a clock spring 68 as shown in FIG. 4 having one end 70 affixed to the frame means 30 and the other end 72 supported by the cam shaft 32. Preferably, the controller apparatus 10 further comprises escapement means 74 for slowing the rotation of the cam shaft 32 upon release of the return spring means 46 by the return spring latch means 48 (FIG. 5). The escapement means 74 desirably comprises a toothed wheel means 76 as shown in FIGS. 4, 6, 2. The toothed wheel 76 on one side 78 has a hub member 80 extending therefrom coaxially aligned with said cam shaft 32. As shown in FIG. 2, the toothed wheel 76 is positioned at the other end 82 of the cam shaft 32. The return spring means 46 is affixed at the one end 70 to the hub member 80 as shown in FIG. 4 by engaging one of the first slots 84 provided in the hub member 80 as shown in FIGS. 8 and 9. The toothed wheel 76 on the other side 86 thereof has a stopping block member 88 as shown in FIGS. 5, 6, and 7 affixed to the toothed wheel 76 in a predetermined position. The escapement means 74, as shown in FIGS. 2 and 4, also comprises a reciprocating means 75 for controlling the rotation of the toothed wheel 76 upon release of the return spring 46 by the return spring latch 48 (FIG. 5). The reciprocating means 75 comprises reciprocatng means 75 which comprises a reciprocating member 77 positioned in working relationship with the toothed wheel 76. Preferably the reciprocating member 77 has a U-shape. The reciprocating member 77 has first aperture means 79 pasing therethrough proximate the bottom 81 of the U-shaped reciprocating member 77. A hinge member means 83 (FIGS. 2 and 3) comprises a hinge member 85 passing through the first aperture 79 and supported by the frame 30. The U-shaped reciprocating member 77 having second slots 87 therein at the ends 89a, 89b thereof. Second aperture means 91 (FIG. 2) pass through the U-shaped member 77 proximate the second slots 87. A toothed wheel roller contact member 93 is supported at ends 65a, 65b (FIG. 2) and extends across the second slots 87. The toothed wheel roller contact members 93 are positioned to contact the toothed wheel 76.

Figure 10:
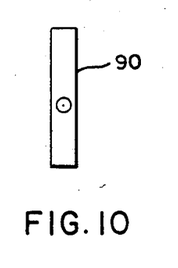
FIG. 10 is an elevational view of the stopping block member.
Figure 11:
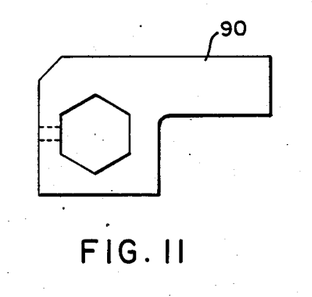
FIG. 11 is a side elevational view of the stopping block member shown in FIG. 10.

The cam shaft return spring latch means 48 (FIG. 5) preferably comprises a dog member 90 such as shown in FIGS. 10 and 11 affixed to the cam shaft 32 adjacent to the toothed wheel 76 for contacting the block member 88 as shown in FIGS. 5, 4. The cam shaft return spring latch 48 preferably further comprises latch assembly means 92 for engaging the block member 88 thereby preventing the spring means 46 from opposing the control motor 50 during normal operation.

Figure 12:
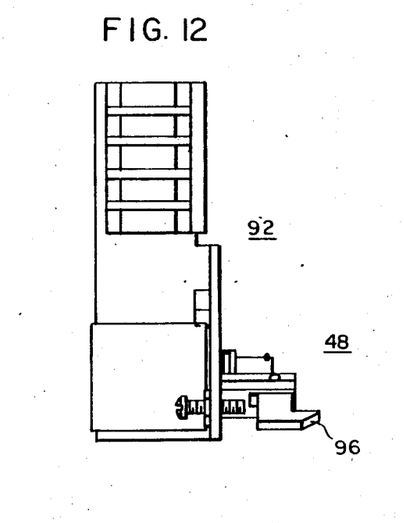
FIG. 12 is an elevational view of the shaft return spring latch.
Figure 13:
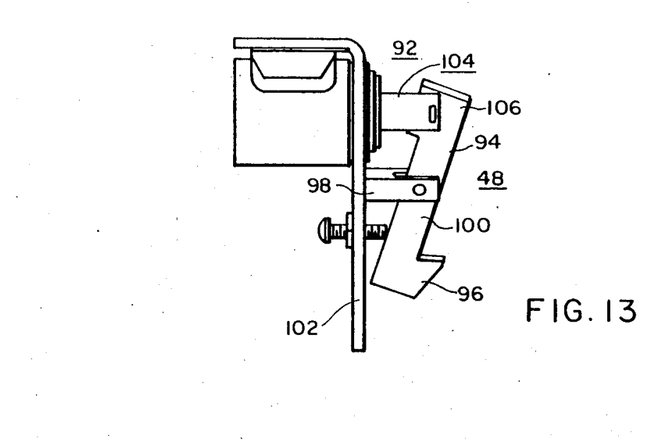
FIG. 13 is a plan view of the shaft return spring latch shown in FIG. 12.

The cam shaft return spring latch means desirably comprises a hinged arm member 94 (FIG. 13). The arm member 94 has a hook portion 96 at one end thereof. Support member 98 is affixed to a base member means 102 as shown in FIGS. 12–14. A solenoid activated rod member means 104 is provided for contacting the other end 106 of the arm member 94, whereby upon the control motor 50 rotating the cam shaft to a predetermined point, the solenoid activated rod member means 104 is activated thereby causing the hook portion 96 of the arm member 94 to engage the block member 88 (FIG. 5) thereby preventing said cam shaft return spring 46 (FIG. 4) from opposing the rotation of the control motor 50.

Figure 19:
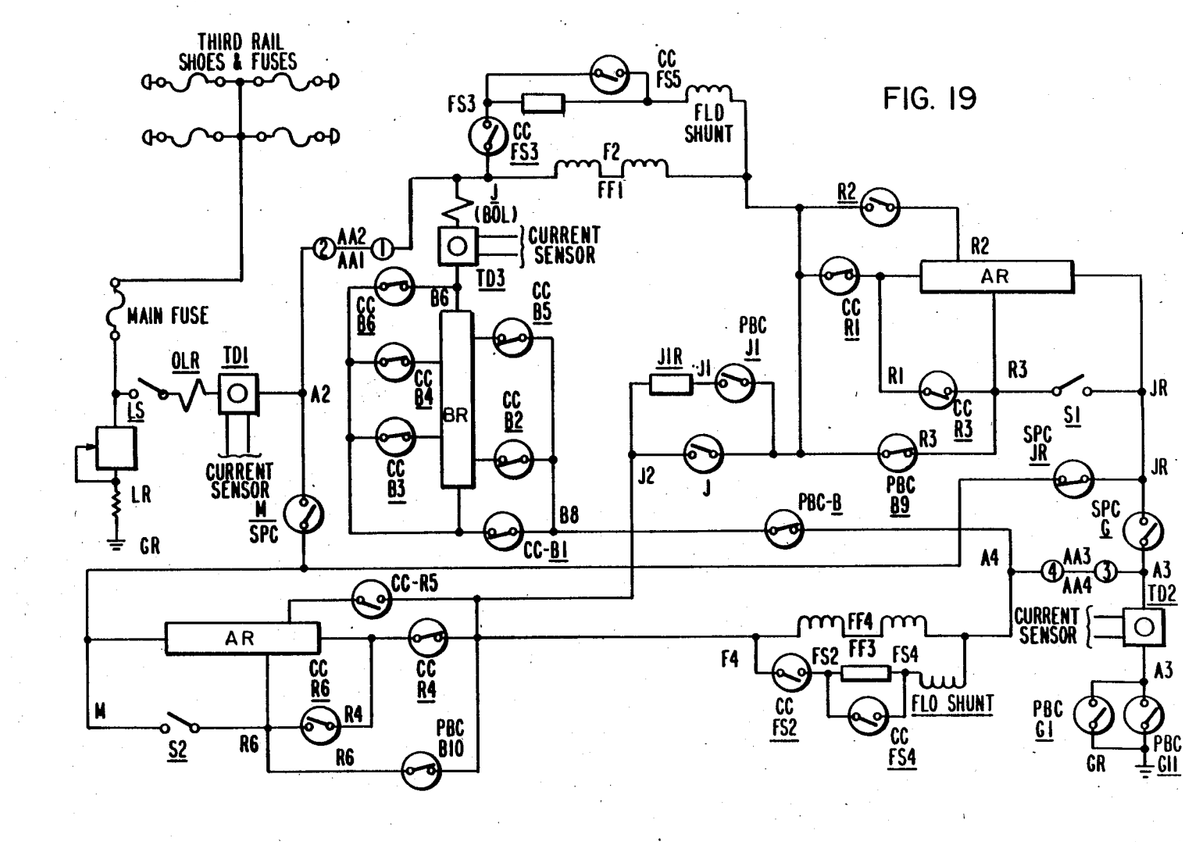
FIG. 19 is a power schematic for operation of the traction motor 16.
Figure 21:
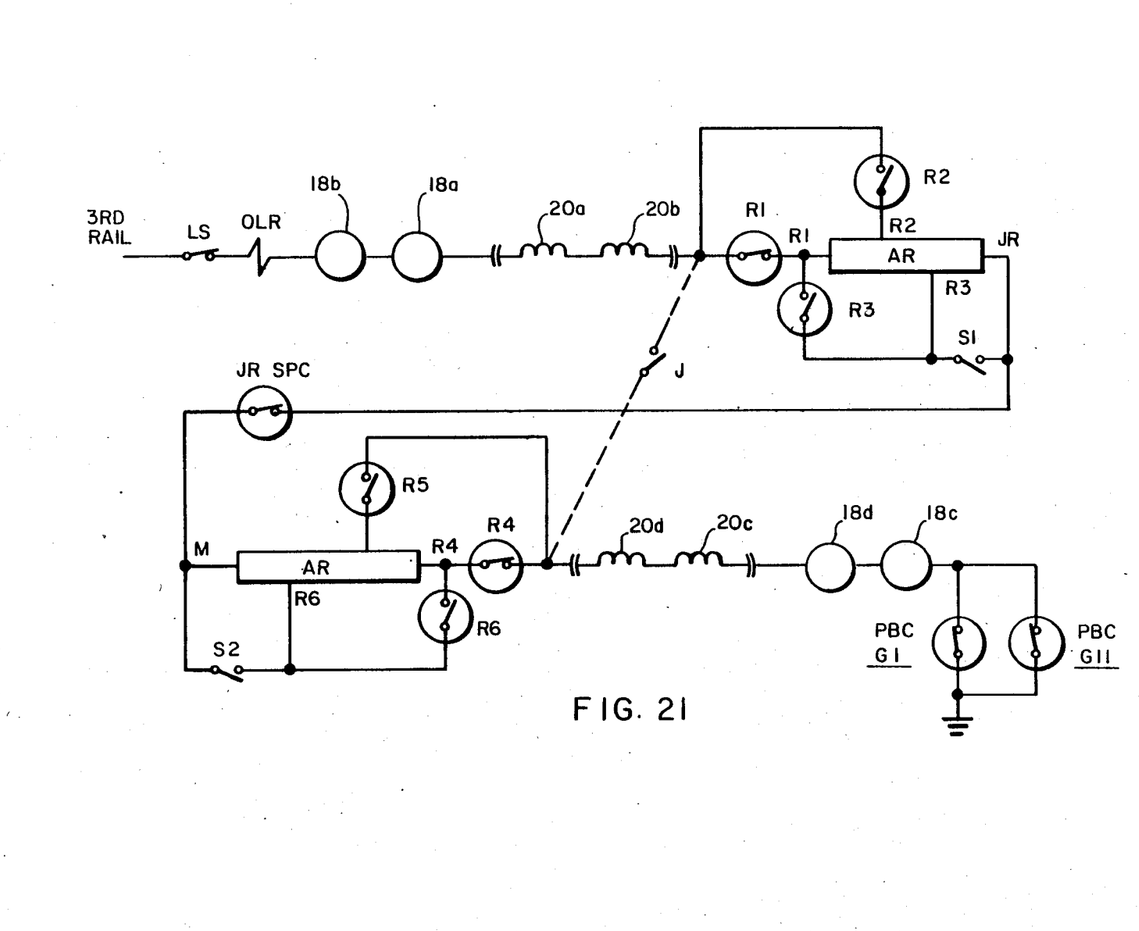
FIG. 21 is a schematic diagram of the initial starting series configuration of a typical transit vehicle.
Figure 22:
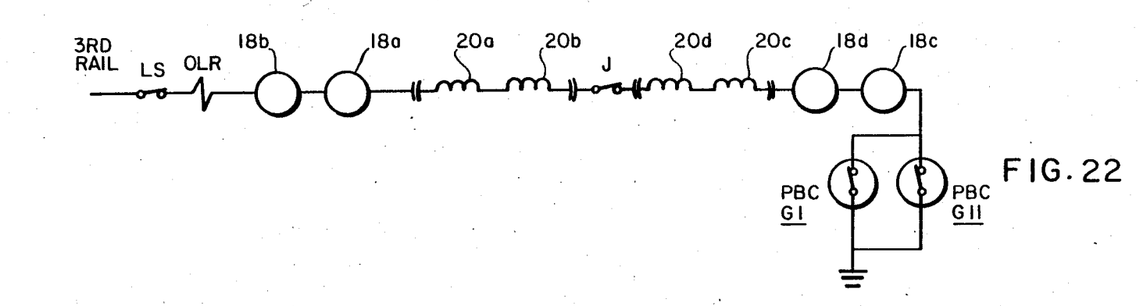
FIG. 22 is a schematic diagram of the full series configuration following initial starting of a typical transit vehicle.
Figure 23:
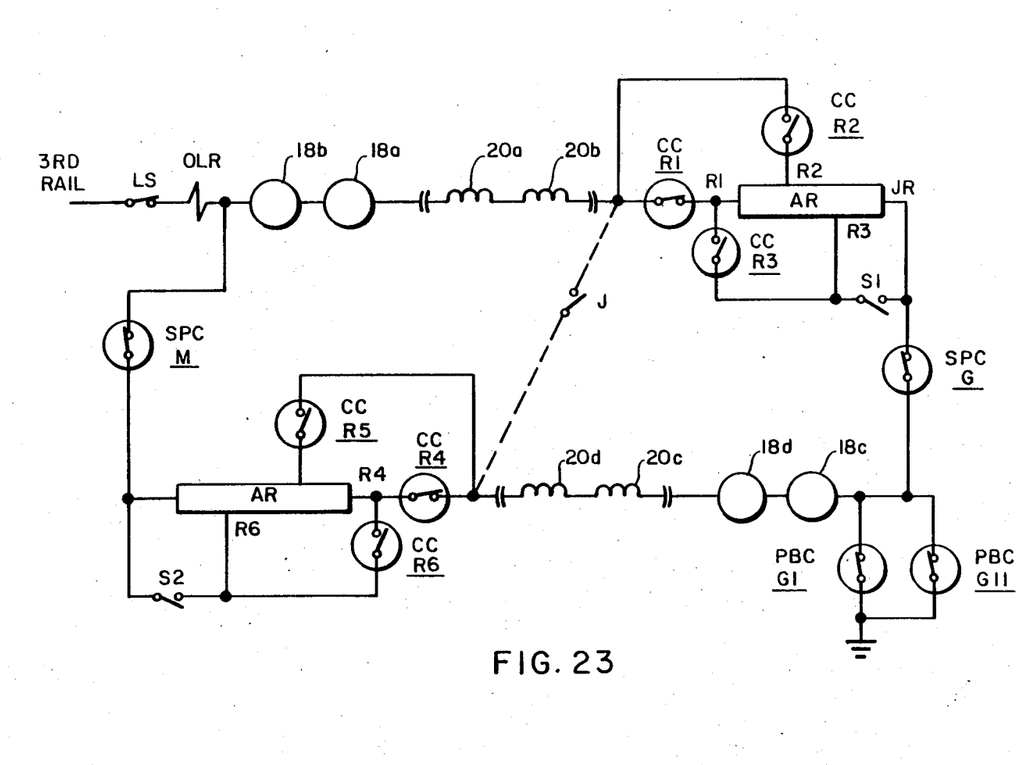
FIG. 23 is a schematic diagram of the parallel configuration of a typical transit vehicle during normal operation following starting.
Figure 24:
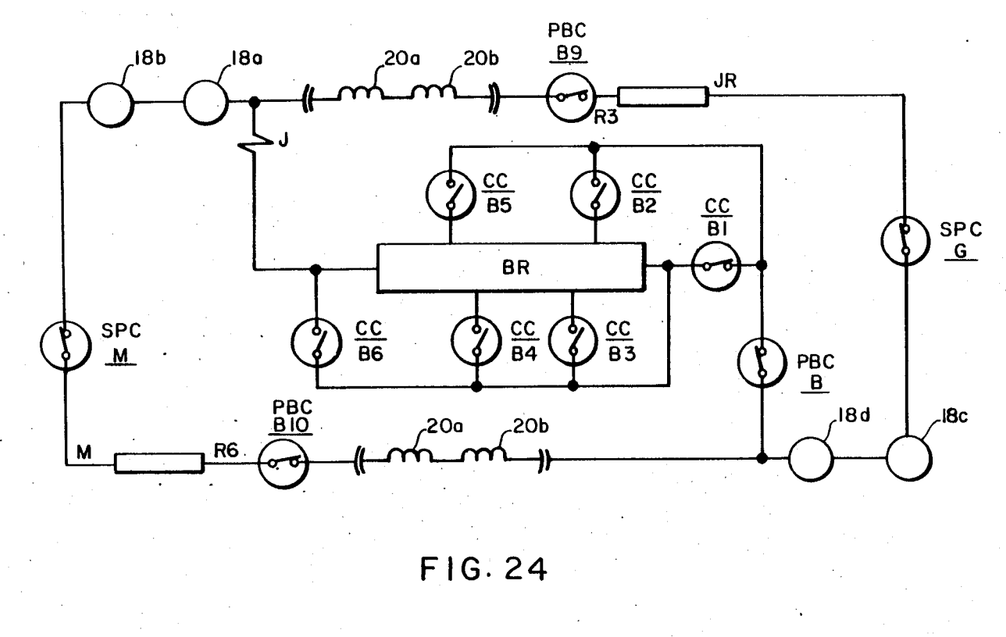
FIG. 24 is a schematic diagram of the brake and coast electrical circuit of a typical transit vehicle during the dynamic braking operation.

One example of controller cam development for the apparatus 10 is shown in FIG. 20 which refers to the power schematic shown in FIG. 19. The designations G, JR, M, G11, G1, B, B9, J1 and B10 correspond to the switches 35 shown in FIGS. 19 through 22 and comprise nine switches 35 shown in FIG. 2. FIGS. 21 through 24 also show switches R1 through R6 for switching in the accelerating resistor AR and braking resistor BR which may be accomplished in the same manner as taught in the aforesaid U.S. Pat. No. 4,458,185 issued to Matty. There are four traction motors shown in FIGS. 19–24. The armature means 18 shown in FIGS. 22–24 are designated 18a, 18a, 18c, 18d and the field means are designated 20a, 20b, 20c and 20d. The letters above the switch designations in FIGS. 19–24 are "SPC" for the series parallel changeover function and "PBC" for the power brake control function. With reference to FIGS. 19–24 the controller apparatus 10 of the present invention replaces previously independent series parallel changeover controllers and power brake controller devices by putting all of the switches for the devices on the single cam shaft 32. The cam development in the four stopping positions of th preferred embodiment of the controller apparatus 10 is shown in FIGS. 19–24 and are referred to mode 0, 1, 2 and 3. Mode 0 is a series-brake (off position). Mode 3 is the parallel-brake (brake or coast) position. Mode 2 is the parallel-power (parallel position) and mode 1 is the series-power (switch and series) position. With the cam shaft return spring 46 of the present invention, the controller apparatus 10 is spring-returned to mode 0 in event of loss of power to the control motor 50. This apparatus is readily adaptable to a microprocessor controlled system such as disclosed in the aforesaid U.S. Pat. No. 4,458,185 issued to Matty et al. As discussed previously, the cam shaft return spring latch means 48 is used to cage the spring during normal operation. The power contactors designated as S1, S2 and J are conventional. In operation, the four traction motors 16 are connected in series, with all resistance inserted for starting such as disclosed in the aforesaid Matty, Stamm and Krings references and as depicted in FIG. 21 which is the initial series starting configuration and FIG. 22 which depicts running to series full field. At series full field, bridge transition occurs leaving the motors 16 connected in two groups of two motors in parallel as shown in FIG. 23. Final acceleration connection leaves each motor at half line voltage with its field shunted. The motors 16 are reconnected for dynamic braking with a pair of motor armatures for example 18a, 18b from one side feeding the fields 20a, 20b of the other side. The circuit switching as descrived in FIGS. 19–24 is conventional.

The controller apparatus 10 of the present invention provides a positive interlock between the series parallel changeover function and the power brake control function that is very advantageous. It also provides positive return to the starting point 42 through the cam shaft return spring in case of power loss. The spring does not oppose the control motor 50 during normal operation. The escapement means 74 slows the return of the cam shaft 32 when powered by the spring 46 from 0.25 seconds without it to 1.25 seconds with the escapement 74. This permits the Line Switch "LS" shown in FIG. 19 to open before the G1 and G11 switches which go to ground. The delay caused by the escapement means also permits the J1 switch to kill the brake current before the switches M and G open to prevent arcing of those switches.

I claim:

1. An integral series parallel changeover and power dynamic brake controller apparatus for a transit vehicle, said vehicle including a plurality of wheels, electrical motors for driving said wheels, said electrical motors each having armature means and field means, power source means for providing power to said electrical motors, said controller apparatus comprising:
   (a) a frame means;
   (b) a single cam shaft carried by said frame means;
   (c) switching means for switching said electrical motors from a parallel circuit arrangement to a series circuit arrangement as desired and for switching electrically said field means and said armature means of said electrical motors as desired to effect dynamic braking;
   (d) a plurality of cams, said cams mounted on said cam shaft to engage said switching means at predetermined intervals;
   (e) control motor means for rotating said cam shaft in a controlled manner;
   (f) cam shaft stop means for maintaining the rotation of said single cam shaft between a predetermined starting point and a final point;
   (g) cam shaft return spring means for rotating said cam shaft back to said starting point in case of loss of power to said control motor means;
   (h) cam shaft return spring latch means for preventing said spring means from opposing said control motor means during normal operation.

2. The controller apparatus of claim 1, wherein said control motor means comprises a control motor having an output shaft, gear means in working relationship with said output shaft of said control motor and said cam shaft whereby rotation of the output shaft of the control motor causes said cam shaft to rotate.

3. The controller apparatus of claim 2, wherein said control motor comprises a stepping motor.

4. The controller apparatus of claim 1, wherein said cam shaft stop means includes a first pin means for said starting point and a second pin means for said final point.

5. The controller apparatus of claim 4, wherein the cam shaft stop means further comprises a bar member affixed to said cam shaft for engaging said first pin means and said second pin means thereby maintaining the rotation of said cam shaft between said starting point and said final point.

6. The controller apparatus of claim 1, wherein said cam shaft return spring means comprises a clock spring having one end affixed to said frame means and the other end supported by said cam shaft.

7. The controller apparatus of claim 6, further comprising escapement means for slowing the rotation of said cam shaft upon release of said return spring means by said return spring latch means.

8. The controller apparatus of claim 7, wherein said escapement means comprises a toothed wheel means supported by said cam shaft, said toothed wheel means on one side thereof having a hub member extending therefrom coaxially aligned with said cam shaft, said return spring means affixed at said one end to said hub member, said toothed wheel means on the other side thereof having a stopping block member affixed thereto in predetermined position, a reciprocating means for controlling the rotation of said toothed wheel means upon release of said return spring means by said return spring latch means.

9. The controller apparatus of claim 8, wherein said cam shaft return spring latch means comprises a dog member affixed to the cam shaft adjacent to said toothed wheel means for contracting said block member.

10. The controller aparatus of claim 9, wherein said cam shaft return spring latch means further comprises latch assembly means for engaging said block member thereby preventing said return spring means for opposing said control motor means during normal operation.

11. The controller apparatus of claim 10, wherein said cam shaft return spring latch means comprises a hinged arm member, said arm member having a hook portion at one end thereof, a base member means for supporting said arm member; a support member affixed to said base member means; said support member for supporting said arm member proximate the center thereof, a solenoid activated rod member means for contacting the other end of said arm member, whereby upon said control motor means rotating said cam shaft to a predetermined point, said solenoid activated rod member means is activated thereby causing said hook portion of said arm member to engage said block member thereby preventing said cam shaft return spring means from causing said block member to contact said dog member affixed to said cam shaft to prevent said cam shaft return spring means from opposing the rotation of said control motor means.

12. The controller apparatus of claim 8, wherein said reciprocating means comprises a reciprocating member positioned in working relationship with said toothed wheel means.

13. The controller apparatus of claim 12, wherein toothed wheel roller contact members are provided said reciprocating member is a U-shape, said reciprocating member having a first aperture means therethrough proximate the bottom of said U-shaped reciprocating member, a hinge member means for supporting said U-shaped reciprocating member, said hinge member means comprising a hinge member passing through said first aperture means and supported by said frame means, said reciprocating slots, said toothed wheel roller contact members are supported in said second aperture means and extend across said second slots, said toothed wheel roller contact members are positioned to contact said toothed wheel means.

* * * * *